United States Patent [19]
Jehle et al.

[11] Patent Number: 5,220,328
[45] Date of Patent: Jun. 15, 1993

[54] TARGET MOTION DETECTING IMPULSE DOPPLER RADAR SYSTEM

[75] Inventors: Robert E. Jehle, Silver Spring; David F. Hudson, Clarksburg, both of Md.

[73] Assignee: The United States of America as represented by the Secretary of the Navy, Washington, D.C.

[21] Appl. No.: 857,536

[22] Filed: Mar. 25, 1992

[51] Int. Cl.⁵ .............................................. G01S 13/86
[52] U.S. Cl. ........................................ 342/21; 342/54
[58] Field of Search .............. 342/21, 54, 88; 356/28, 356/28.5

[56] References Cited

U.S. PATENT DOCUMENTS 2,821,702  1/1958  Russell .
2,885,668  5/1959  Eaton .
4,131,889  12/1978  Gray ................................... 342/21
5,095,312  3/1992  Jehle et al. ......................... 342/21

Primary Examiner—Mark Hellner
Attorney, Agent, or Firm—Kenneth E. Walden; Jacob Shuster

[57] ABSTRACT

Radiant energy intermittently emitted from a transmitter is reflected as echo pulses from a moving target being interrogated to produce Doppler signals by counting of photons of the echo pulses during time domain intervals between emission from the transmitter. Such counting of photons is limited to the time domain intervals by operational control of a laser pump through which a reference beam is generated at an energy level activating detectors irradiated by such beam to count the photons absorbed therein after capture of the photons by a receiving antenna.

6 Claims, 3 Drawing Sheets

TARGET MOTION DETECTING IMPULSE DOPPLER RADAR SYSTEM

BACKGROUND OF THE INVENTION

This invention relates to radar detection in general and more particularly to detection of moving targets interrogated by emission of radiant energy reflected from such targets as echo pulses to be picked up by an optical receiver producing Doppler signals that are processed and readout to provide target motion data. Such a radar system is covered in our prior related U.S. application Ser. No. 07/687,602, now U.S. Pat. No. 5,095,312 filed Apr. 12, 1991, (now U.S. Pat. No. 5,095,312) the disclosure of which is incorporated herein by reference.

Doppler radar systems of the foregoing type are also disclosed for example in U.S. Pat. Nos. 2,821,702, 2,885,668 and 4,131,889 to Russell, Eaton and Gray, respectively. According to the foregoing patents separate pulse transmitting and echo pulse receiving antennas are featured. Signal processing according to the Gray patent includes internal generation of a reference signal utilized through a mixer to correlate impulse transmitter operation with reception of target reflected radiation. According to the Russell patent, operation of the impulse transmitter is controlled through a transmit/receiver switch.

Conventional Doppler radar systems as well as those disclosed in the foregoing referred to patents suffered from various motion readout problems because of signal clutter and an inability to isolate the radiant energy reflections from the moving targets being monitored to provide accurate readout information thereon. It is therefore an important object of the present invention to overcome the foregoing deficiencies of prior art Doppler radar systems.

SUMMARY OF THE INVENTION

In accordance with the present invention, an impulse transmitter of a wideband microwave type emits pulses of radiant energy of very short duration with reduced peak power for interrogation of moving targets including solid objects as well as phenomena such as wind shear and clear air turbulence. The photons of echo pulse radiation reflected from a target above a predetermined energy level are captured by an optical receiving antenna of the system and are sensed by an array of detectors in precise timed relation to operation of the transmitter. Photon detection is thereby limited to spaced time domain intervals between emission of the pulses from the transmitter into space from its antenna. During such intervals the photons are counted to obtain spectrum measurement data in terms of photon number and energy level. Such data is processed to produce a readout with reduced clutter of target isolated motion information.

The detectors through which the photons are counted in accordance with the present invention, are rendered operative in response to irradiation by a reference beam of predetermined energy level directed thereto from a laser pump. The antenna captured photons are absorbed within the reference beam for counting thereof. Operation of the laser pump is controlled in timed relation to operation of the transmitter to limit photon detection to the time domain intervals as aforementioned.

BRIEF DESCRIPTION OF THE DRAWING FIGURES

Other objects, advantages and novel features of the invention will become apparent from the following detailed description of the invention when considered in conjunction with the accompanying drawing wherein.

DETAILED DESCRIPTION OF PREFERRED EMBODIMENT

Figure 1:
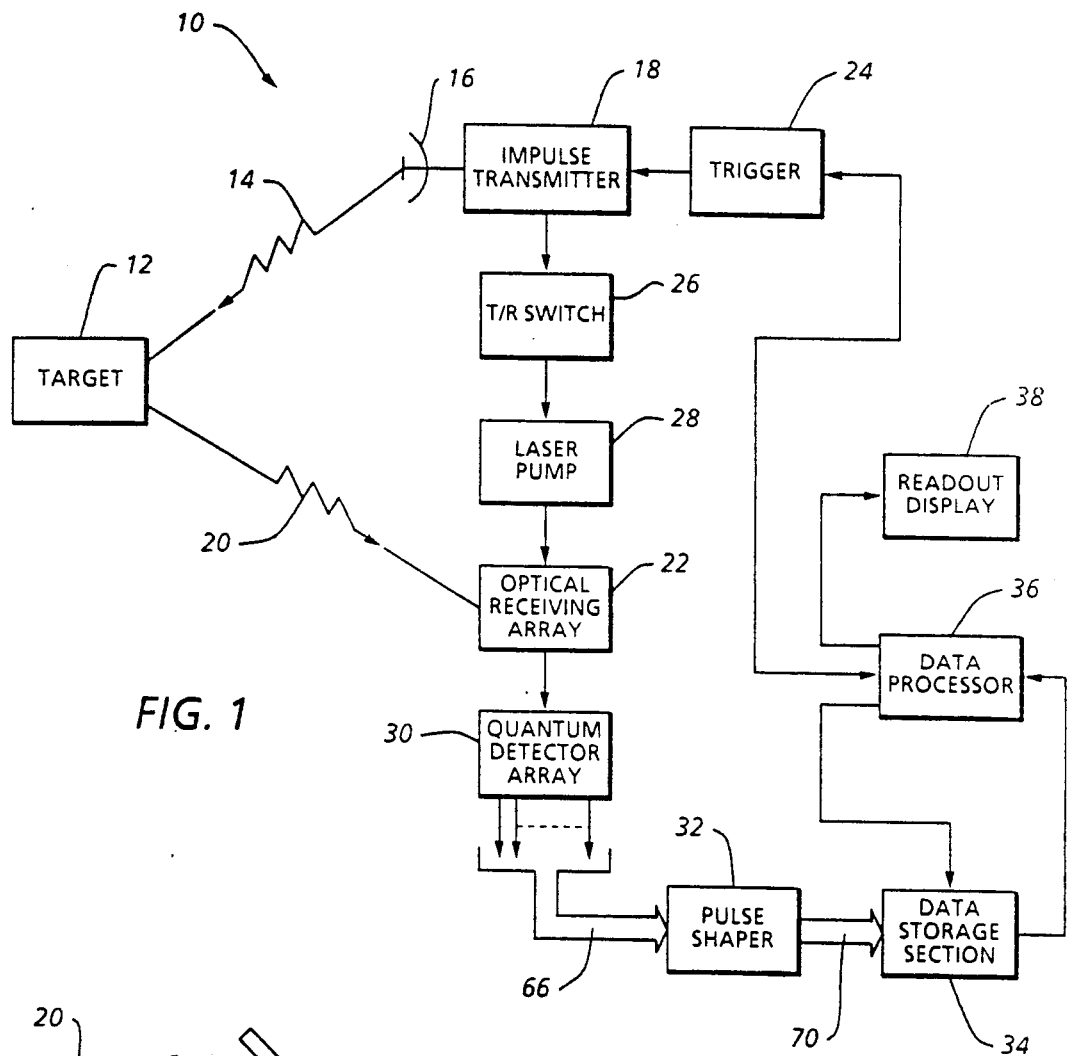
FIG. 1 is a schematic block diagram depicting the system of the present invention.

Referring now to the drawing in detail, FIG. 1 diagrams a Doppler radar system generally referred to by reference numeral 10 through which motion of a target 12 is detected in accordance with the present invention. The target 12 as shown reflects electromagnetic radiation 14 impinging thereon. Such radiation 14 is in the form of pulses emitted into space from an antenna 16 remote from the target. The antenna 16 is driven by an impulse transmitter 18 of a wideband microwave type. The target impinging radiation 14 is reflected from the target as pulse echo radiation 20 picked up by the optical receiving section 22 of system 10 as diagrammed in FIG. 1.

Operation of transmitter 18 is controlled by a trigger component 24 to produce output pulses radiated by the antenna 16, said pulses having an extremely rapid rising amplitude of short duration (pico seconds). During operation of transmitter 18, a transmit/receiver switch 26 is actuated to operate a laser pump 28 through which the optical receiving section 22 is deactivated to prevent reception of signal energy radiation when the transmitter 18 is producing its narrow output pulses. Between such transmitter operations the switch 26 is operative to render the optical receiving section 22 effective to receive the reflected echo radiation 20. In response to reception of radiation 20 above a predetermined energy level, signifying reflection from the target 12 being monitored, the optical receiving section 22 supplies photons, as the carrier of the radiant energy received, to a quantum detector array 30 in precise timed relation to operation of transmitter 18. The outputs of the array of quantum detectors 30 in lines 66 are amplified by passage through a pulse shaper section 32 to supply triggering signals through lines 70 to data storage section 34 interconnected with a data processor 36 to which the trigger component 24 is coupled as diagrammed in FIG. 1. Signal and data processing is thereby limited to spaced time domain intervals between transmitter operation.

The outputs 70 of the pulse shaper section 32 provide measurement data to the data storage section 34 and data processor 36, in response to sensing of the echo pulse radiation 20 from the target. Such measurement data undergoes signal processing limited as aforementioned to time domain intervals between pulse outputs of the transmitter 18. Target spatial data in terms of photon number and energy is thereby produced, stored and compared for readout of target isolated data in the readout display 38 with a reduce clutter effect.

Figure 2:
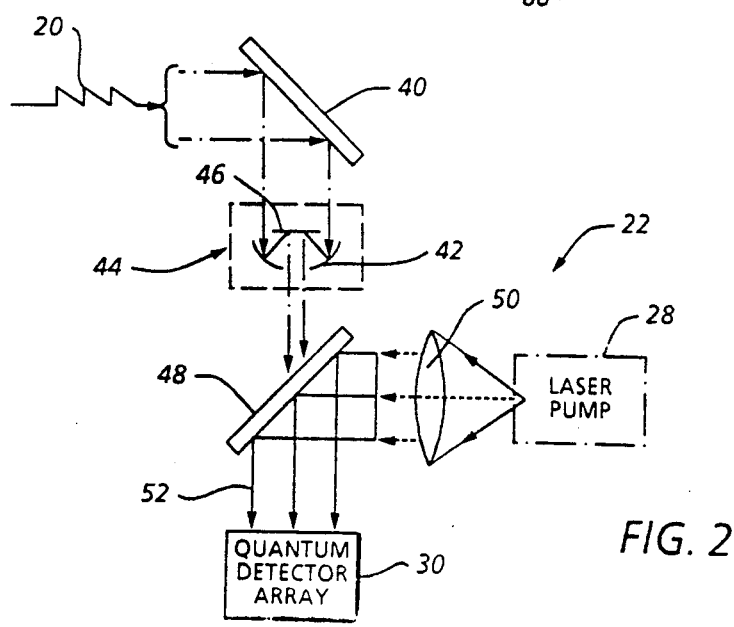
FIG. 2 is a schematic diagram depicting in greater detail the optical receiving section diagrammed in FIG. 1.

The optical receiving section 22 as depicted in FIG. 2, includes a refractive prism 40 through which incident radiation 20 reflected from the target is directed to primary collecting reflectors 42 of an optical receiving antenna 44 having a secondary reflector 46. Photons of the incident radiation are directed by reflector 46 through a dichroic mirror 48 onto the quantum detector array 30 while absorbed within a reference laser beam of radiation 52 originating from the laser pump 28 and passing through a beam expander lens 50. The energy level of the expanded reference beam 52 renders the quantum detectors in array 30 effective to sense reception of the target reflected photons by the optical receiving section 22.

Figure 3:
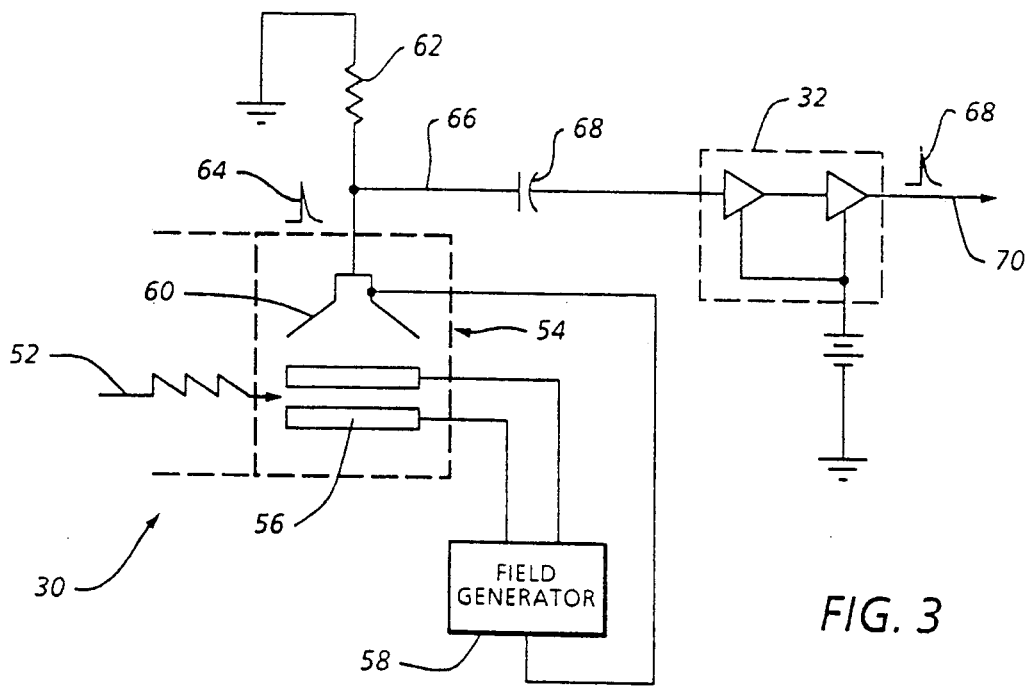
FIG. 3 is a circuit diagram of a quantum detector associated will the array diagrammed in FIG. 1.

As shown in FIG. 3, the array 30 includes a plurality of Rydberg type of quantum detector devices 54, according to one embodiment of the invention. Such quantum detector devices 54 have windows aligned in a common plane to form an input area fully covered by the expanded laser beam 52 of a predetermined energy level so that all of the quantum devices are pumped to their excited states. As is already known in the art, the enclosed body of gas within each quantum detector device 54 pumped to the excited state is adjusted to a Rydberg level above the Stark effect by means of an electric field established across electrodes 56 by a field generator 58 connected thereto as diagrammed in FIG. 3. A channel multiplier 60 connected to ground through resistor 62 is also enclosed within the quantum detector device to produce a signal fed to its output line 66 coupled by capacitor 68 to the pulse shaper section 32 from which an amplified pulse 68 is transmitted by an output line 70 to the data storage section 34.

The energy level of the gas within each quantum detector device 54 in the excited state is preadjusted so as to accommodate establishment of a resonance condition in accordance with the Stark effect. Such preadjustment is effected by selective ionization of the gas through the field generator 58 and electrodes 56 as diagrammed n FIG. 3 pursuant to a technique generally known in the art. In such resonance condition, photons at a predetermined energy level (E) captured by the optical receiving section 22 have a high probability of being absorbed by atoms of the gas in each quantum detector device 54 in its excited state at a preadjusted energy level (N) so as to excite the gas to the next higher energy level (M). By means of the channel multiplier 60, the electrons or ions produced by the electric field between electrodes 56 produces the pulse shaped output pulse 68 to distinguish between the energy levels (N) and (M) of the gas in the quantum detector device 54 and thereby indicate detection of photons from incident radiation 20 reflected from target 12.

The foregoing operational tuning of the quantum detector devices 54 to the photon energy of the reflected radiation 20 produces the shaped pulses 68 representing different photon energy ranges of interest. Adjacent groups of quantum detector devices in array 30 may be tuned to different bandwidths which overlap or are non-overlapping to form continuous coverage of an energy spectrum. The shaped output pulses 68 representing the different energy ranges of the spectrum are collected by the data storage section 34 and measured, compared or added to previously stored data from the data processor 36 which also produces transmitter timing signals fed to the trigger component 24 for limiting transmitter operation to periods between spaced time domain intervals during which target motion data is fed to the readout display 38.

Figure 4:
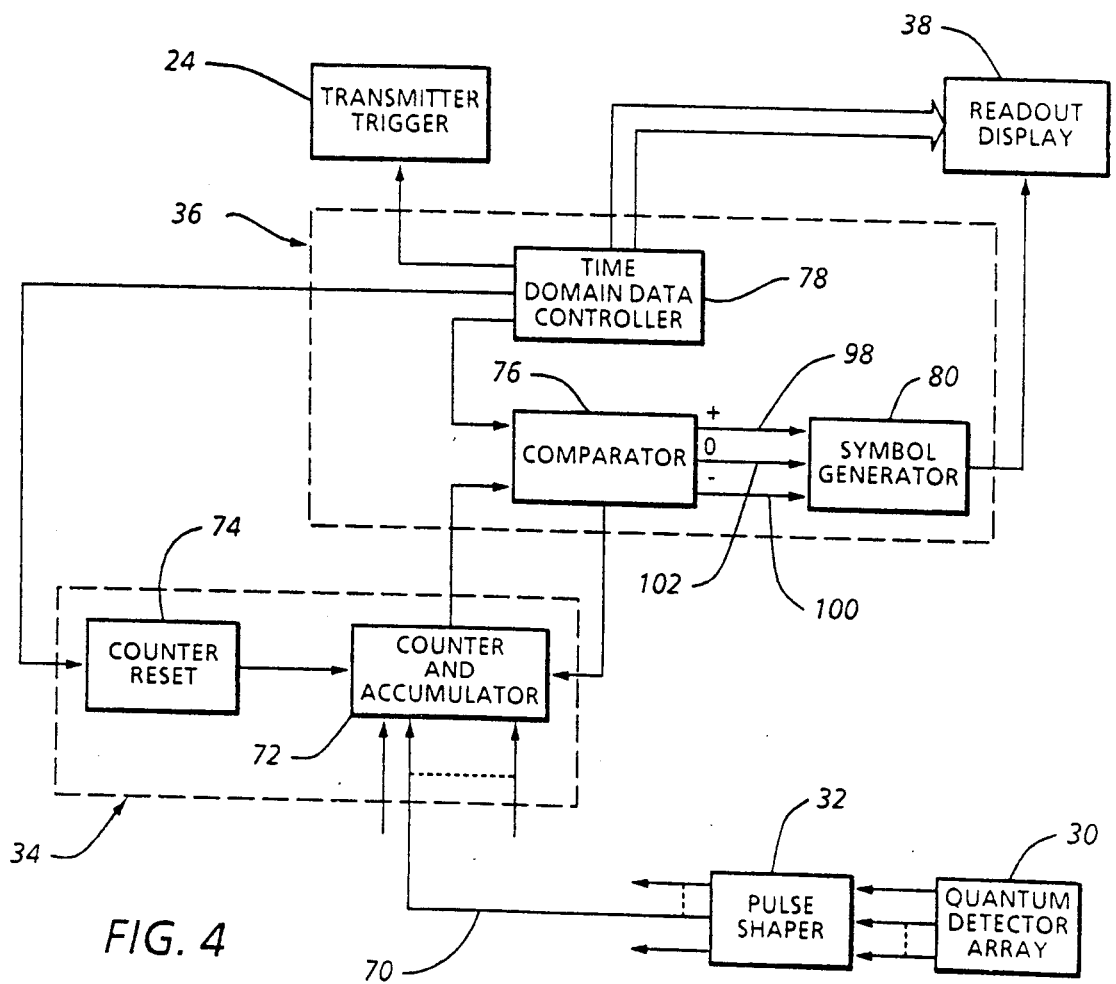
FIG. 4 is a circuit block diagram depicting in greater detail the data storage and data processor sections diagrammed in FIG. 1.

As diagrammed in FIG. 4, the pulse shaped outputs of the quantum detector array 30 in lines 70 trigger circuits in a counter and accumulator 72 of the data storage section 34 to count the number of photons received per energy range. The counter and accumulator 72 is coupled to the comparator section 76 of the data processor 36 for comparison of photon counts when activated by timing signals from a time domain data controller 78 which also controls the counting operation through counter reset 74 of the data storage section. Output signals from comparator 76 are fed to a symbol generator 80 of the data processor from which output data is fed to the readout display 38. The comparator 76 also supplies data to the counter and accumulator 72 for accumulation and adding thereof to the incoming data from the pulse shaper 32 as diagrammed in FIG. 4.

Figure 5:
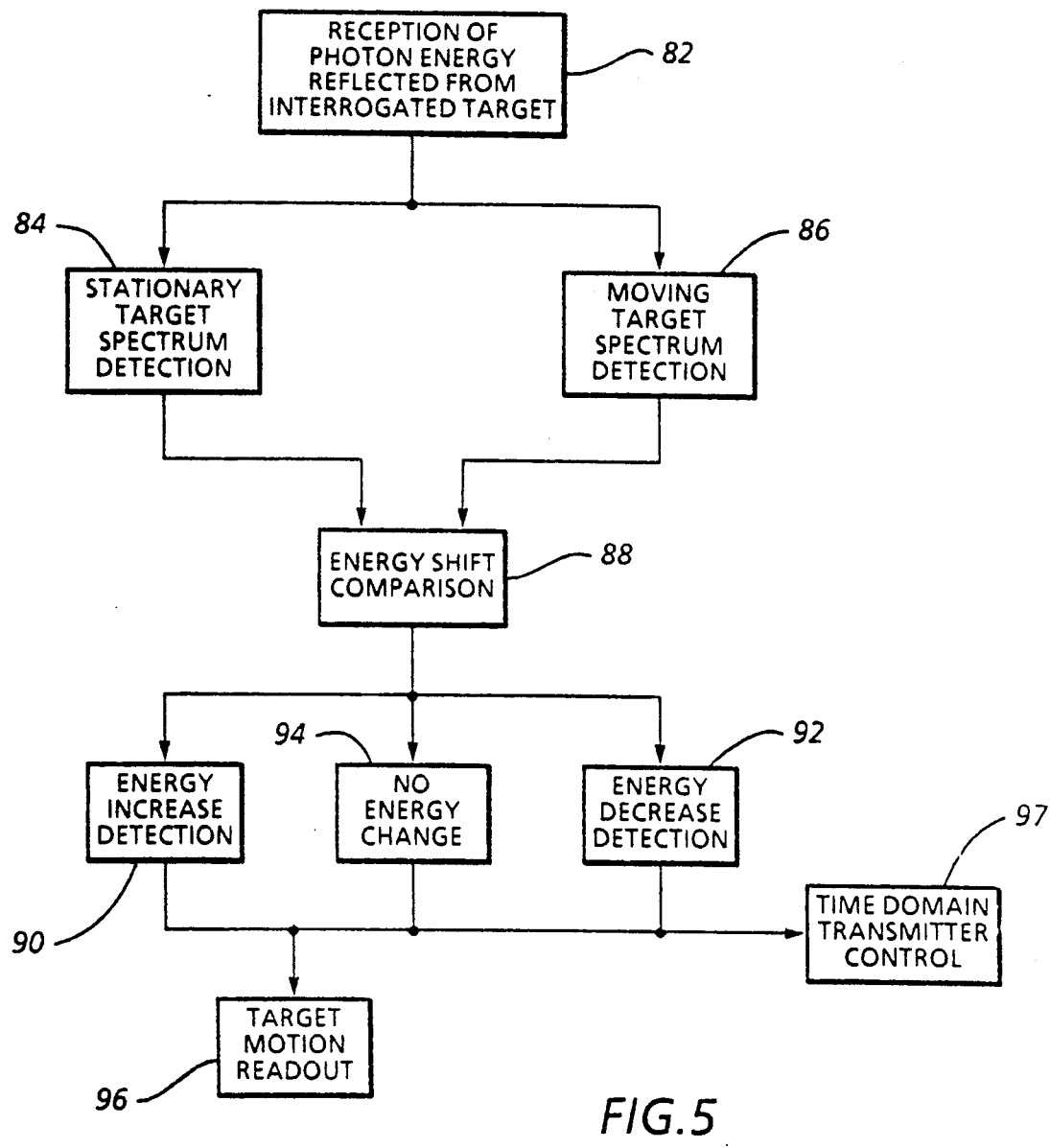
FIG. 5 is a block diagram of the operational program associated with the system of FIGS. 1-4, in accordance with the present invention.

It will be apparent from the foregoing description that the incoming data to the data storage section 34 represents reception of photon energy reflected from the target 12 being interrogated, as denoted by block 82 in FIG. 5 As a result of the time-controlled actions hereinbefore described in connection with the data storage section 34 and data processor 36, energy spectrums are detected with respect to stationary and moving targets from the reflected photon energy received, as respectively denoted by blocks 84 and 86 of the FIG. 5 diagram. By data comparison within comparator 76, shifts in photon energy are monitored, as denoted by diagram block 88, to detect increases or decreases in photon energy levels as denoted by blocks 90 and 92 respectively reflecting approach and departure of the target in motion. Substantially no change in photon energy is also detected, as denoted block 94, reflecting a stationary target or a target moving at a very low velocity. The latter energy shifts denoted by blocks 90, 92 and 94 form the motion data signals fed by comparator 76 to the symbol generator 80 through which target motion readout is obtained, as denoted by block 96 in FIG. 5, by signal data processing of the target reflected radiation in accordance with the present invention. Reception of the target reflected radiation and signal data processing thereof is limited to the aforementioned time domain intervals between pulse emissions from the transmitter driven antenna 16 as hereinbefore described and denoted by diagram block 97 in FIG. 5.

Thus, in accordance with the present invention changes in the number of photons of higher energy signifies the presence of approaching or departing targets since photons are reflected from a target having components of motion parallel to its trajectory in a direction against or with the photons. Corresponding positive or negative signals will accordingly appear in output lines 98 and 100 from comparator 76 to the symbol generator 80 as diagrammed in FIG. 4 to produce appropriate symbols of an approaching or departing target to be readout by display 38. A stationary target or a slowly moving target causing a non-detectable change in energy level of reflected photons will produce an output signal in the zero line 102 from the comparator 76 indicating through display 38 that the region interrogated by radar system 10 is free of targets moving below a minimum velocity.

Numerous other modifications and variations of the present invention are possible in light of the foregoing teachings. It is therefore to be understood that within the scope of the appended claims the invention may be practiced otherwise than as specifically described.

We claim:

1. In a radar system for monitoring a moving target which includes: transmitter means for emission of radiant energy, antenna means for reception of echo pulses of the radiant energy reflected from the target, data readout means for processing measurements obtained from detection of photons in the reflected radiant energy during time domain intervals and trigger means operatively connecting the data readout means to the transmitter means for limiting said emission of the radiant energy to periods between said time domain intervals, the improvement residing in: laser pump means for generating a reference beam of radiant energy within which the photons are absorbed and optical means directing said reference beam with the photons absorbed therein to the data readout means for establishing the measurements undergoing said processing therein.

2. The system as defined in claim 1 wherein said means for detection of the photons includes an array of quantum detectors rendered effective in response to irradiation by said reference beam of radiant energy above a predetermined energy level.

3. In a radar system having a microwave source, trigger means for repetitively turning the source on and off to generate a microwave signal, transmit antenna means for emitting the microwave signal generated by the source when turned on, receive antenna means for reception of reflections from a moving target of the microwave signal emitted from the transmit antenna means, readout means for processing signals derived from said reflections captured by the receive antenna means and timing control means connected to the trigger means for limiting said reception of the reflections and processing of the signal derived therefrom to time domain intervals between the turn off and the turn on of the source, said readout means including data storage means for counting photons of radiant energy in the reflections captured by the receive antenna means and comparator means connected to the data storage means and the timing control means for detecting changes in energy level of the reflections captured by the receiver antenna means during said time domain intervals.

4. The system as defined in claim 3 wherein the readout means further includes an array of quantum detectors, laser pump means for generating a reference beam of radiant energy irradiating said array of quantum detectors at an operational energy level and optical means directing the photons captured by the receive antenna means for absorption within the beam of radiant energy irradiating the array of quantum detectors.

5. In a pulse echo motion determining system having a transmitter emitting pulses of radiant energy, pulse receiver means for capturing photons of said pulses reflected from a target and readout means operatively connected to the receiver means for indicating motion of the target as a function of time between emission of the pulses by the transmitter and said capture of the target reflected photons by the receiver means; the improvement residing in: laser pump means for generating a reference radiation beam of predetermined energy level within which the captured photons are absorbed, detector means rendered operative by the reference radiation beam for counting the photons absorbed therein and means for limiting operation of the laser pump means in timed relation to operation of the transmitter.

6. In a radar system for monitoring a moving target involving intermittent emission of radiant energy reflected from the target and counting of photons of the reflected radiant energy during time domain intervals between said intermittent emission of the radiant energy, the improvement residing in the steps of: generating a reference beam of radiation during said time domain intervals at a predetermined energy level; absorbing the photons within said reference beam to increase the energy level thereof and limiting said counting of the photons to the photons absorbed within the reference beam.

* * * * *